June 29, 1965
P. D. MATTERN
3,191,304
DENTAL MATRIX CLAMP OR RETAINER
Filed March 7, 1963
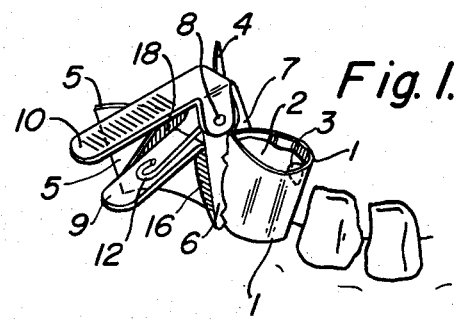
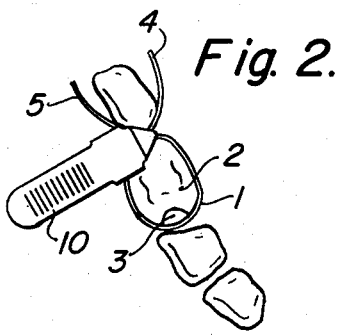
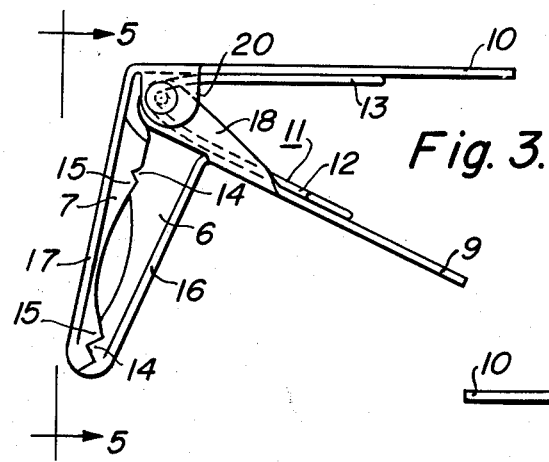
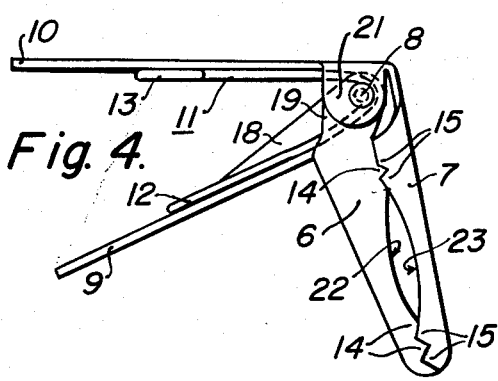
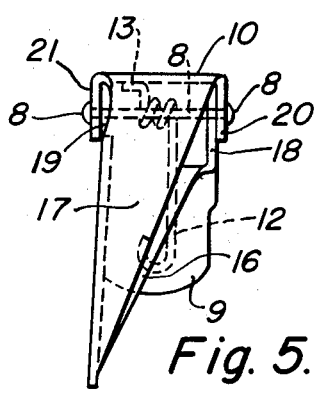
INVENTOR.
PAUL D. MATTERN
BY
*Leonard L. Kalish*
ATTORNEY.

3,191,304
DENTAL MATRIX CLAMP OR RETAINER
Paul D. Mattern, 86 Williams Lane, Hatboro, Pa.
Filed Mar. 7, 1963, Ser. No. 263,670
7 Claims. (Cl. 32—63)

The present invention relates to a dental and matrix clamp or retainer, for clamping or retaining and holding in place a so-called dental matrix strip or dam around a tooth whose cavity is to be filled with a dental amalgam or any other dental filling material. Dental matrix strips, made of either a transparent plastic material or other suitable plastic or other material, are wrapped around a tooth when the cavity therein from side thereof facing an adjacent tooth, and the purpose of the matrix strip or dam strip is to confine the cavity-filling material so that when it is more or less pressed or compacted into the cavity, it will not bulge out and approach or contact the adjacent tooth facing it.

One of the objects of the present invention is an efficient clamp or retainer for such matrix-strips, which may be readily applied and which will hold the matrix-strips firmly in place, and whose handle-members extend outwardly so that they do not interfere with the teeth of the other jaw.

A further object of the present invention is a dental matrix or dam retaining and clamping device which can be manufactured readily and at a low cost and which will be durable and reliable in its application.

In the accompanying drawing in which like reference drawings indicate like parts.

FIGURE 1 represents a prospective view of the matrix-strip retainer for a clamp, showing it in actual use as applied to a matrix-strip wrapped around one of the teeth of the lower jaw.

FIGURE 2 represents a top plan view of the matrix-strip retainer or clamp as applied in the manner indicated in FIGURE 1.

FIGURE 3 represents a side elevational view of the matrix-strip retainer or clamp, shown on an enlarged scale, and with the jaws thereof closed.

FIGURE 4 represents another side elevational view thereof, viewed from the side thereof opposite to that shown in FIGURE 3.

FIGURE 5 represents an elevational view, viewed generally along line 5 of FIGURE 3.

As indicated in FIGURES 1 and 2, the dam-forming loop 1 of the matrix-strip extends around the tooth 2 whose cavity 3 is to be filled at a point facing the adjacent tooth. The free ends 4 and 5 of the matrix-strip extend along the inside and the outside of the tooth adjacent the other side of the tooth 2 to be filled.

The clamp comprises a pair of thin toothed jaws 6 and 7, pivotally connected with each other by means of the pivot 8 which is disposed generally at a right angle to the plane of the jaws 6 and 7, and the handle members 9 and 10 form integrally with the jaws 6 and 7 (respectively) in the manner shown in the drawing and more fully described hereinafter.

A spring, designated generally by the numeral 11, and comprising either a generally U-shaped flat leaf spring or a torsion spring formed of one of two or more turns of a spring wire extending around the central portion of the pivot 8, and having arms 12 and 13 pressing outwardly against the handle members 9 and 10, urge the handle members apart and correspondingly to urge the jaw members 6 and 7 towards each other, into clamping position.

Each of the jaws 6 and 7 has intermeshing teeth 14 and 15, respectively, as indicated in FIGURES 3 and 4, which are adapted to bite into the matrix-strip so as to get a more or less interlocking grip thereon, when the jaws are clamped onto the two spans of said strip in the manner indicated in FIGURES 1 and 2, thereby firmly to hold the loop 1 of the matrix-strip tightly against the tooth to be filled and so as firmly to maintain it in its damming position.

The outer jaw 6 has a bracing flange 16 formed integrally therewith and disposed at a right angle thereto, while the jaw 7 has a similar bracing flange 17 formed integrally therewith and disposed at a right angle thereto.

The flat handle 9 is formed in direct continuation of (and integrally with) the flange 16, while handle 10 is formed in direct continuation of (and integrally with) the flange 17, as indicated particularly in FIGURE 3.

The pivot-receiving portion, flange or ear 18 is formed integrally with the handle 9 and at a right angle thereto, and a similar pivot-flange or ear 19 extends from the jaw 8, and generally in the plane thereof, the pivot-flanges or ears 18 and 19 serving to support the jaw 6 and the handle 9 thereof to the pivot 8.

A similar pivot-flange or ear 20 is bent down from the handle 10, at a right angle thereto, and flanks the pivot-flange 18, and a similar pivot-flange or ear 21 is bent down from the handle 10, to flank the pivot-flange or ear 19; the pivot-flanges or ears 20 and 21 serving pivotally to support the jaw 7 and handle 10 thereof.

The flanges 16 and 17 are tapered, with the widest portions thereof nearest their points of pivotation, and with their narrowest points or zones at or near the free ends of the jaws 6 and 7, as indicated particularly in FIGURES 3 and 5.

The pivot 8 extends through aligned pivot-holes in the inner pivot-flanges or ears 18 and 19 and through corresponding pivot-holes in the outer pivot-flanges or ears 20 and 21, and has its outer ends riveted over or swaged as indicated in FIGURE 5, so as to secure the pivot in place.

The one or several turns of the spring 11 extend around the portion of the pivot 8 which is intermediate the two inner flanges or ears 18 and 19.

The jaw 6, and its bracing-flange 16, handle 9 and pivot-flanges or ears 18 and 19 comprise a single integral member, formed of a single piece of sheet-metal, preferably stainless steel or the like. The jaw 7, and its bracing-flange 17, handle 10 and its pivot-flanges or ears 20 and 21 form another integral or unitary member, likewise formed of a single piece of stainless steel sheet.

The jaws 6 and 7 are sufficiently thin, that their two edges can nest between adjacent teeth as indicated in FIGURES 1 and 2, while interlockingly or bitingly gripping the matrix-strip.

The plane of the handle 9 is generally at a right angle to the plane of the jaw 6 and is also at a right angle to the plane of the flange 16 thereof. Likewise, the plane of the handle 10 is at a right angle to the plane of the jaw 7 and is approximately at a right angle to the flange 17 thereof.

The handles 9 and 10 extend outwardly and diverge from each other a suitable extent, so that by bringing the handles together (against the force of the spring 11), the jaws 6 and 7 can be spread apart sufficiently to permit the jaws to be applied over the matrix-strip. The handle 9 extends outwardly at approximately 90° or somewhat less than 90° to the median line of the toothed edge of jaw 6, while the handle 10 extends outwardly at a right angle or at an angle somewhat greater than 90° to the median line of the toothed edge of jaw 7, so that when the clamp is applied, in its operative position, indicated particularly in FIGURE 1, the two handles 9 and 10 extend directly outwardly of the teeth, where they are easily gripped for both application and release, and do not interfere with the teeth of the opposite jaw.

The jaws 6 and 7 have intermeshing teeth 14 and 15 (respectively) near their free ends, and have similar intermeshing or internesting teeth 14 and 15 (respectively) near their pivoted ends, and between these two spaced-apart sets of intermeshing teeth, the jaws 6 and 7 have concave or relieved edges 22 and 23, respectively, for clearing the contact-zones of the adjacent teeth between which the jaws nest when clampingly engaging the matrix-strip so as to insure the teeth 14 and 15 biting into the matrix-strip above and below the zones of the adjacent teeth which most closely approach each other or what may be called the contact-zones of adjacent teeth.

Having shown and described an embodiment of my invention, I claim the following:

1. A dental matrix clamp for holding in place in a taut condition a flexible dental matrix strip around a tooth whose cavity is to be filled with a dental filling-material, including a pair of thin sheet-metal jaws having their co-acting edges in operative alignment with each other so that they abut each other when the jaws are in their fully closed positions, an integral handle formed in continuation of each of said jaws and extending in a direction transversely of the jaw, a pivot-receiving portion formed integrally with each jaw and handle, said pivot-receiving portions having aligned pivot holes therethrough, a pivot extending through said pivot holes and permanently securing said jaws and their respective handles in pivotal relation to each other, a spring resiliently urging said jaws toward their closed positions and said handles into their spread-apart positions, the co-acting edges of said jaws having tooth-like serrations along juxtaposed portions thereof near the pivoted ends thereof and along juxtaposed portions thereof near the ends thereof farthest from the pivot and having relieved non-abutting portions between the serrated portions thereof.

2. A dental matrix clamp for holding in place in a taut condition a flexible dental matrix strip around a tooth whose cavity is to be filled with a dental filling-material, including a pair of thin and generally co-planar sheet-metal jaws, an integral bracing flange extending laterally from the outer edge of each jaw and generally at a right angle to the plane of the jaw, an integral flat handle formed in continuation of each of said bracing flanges and at an angle thereto and extending in a direction transversely of the jaw and generally parallel with the plane thereof, a pair of spaced apart pivot-receiving portions formed integrally with each jaw and its flange and handle, said two pairs of pivot-receiving portions having aligned pivot holes therethrough, a pivot extending through said pivot holes and permanently securing said jaws and their respective flanges and handles in pivotal relation to each other, a spring resiliently urging said jaws toward their closed positions and said handles into their spread-apart positions, the co-acting edges of said jaws having tooth-like serrations along juxtaposed portions thereof near the pivoted ends thereof and along juxtaposed portions thereof near the ends thereof farthest from the pivot and having relieved non-abutting portions between the serrated portions thereof.

3. A dental matrix clamp for holding in place in a taut condition a flexible dental matrix strip around a tooth whose cavity is to be filled with a dental filling-material, including a pair of stainless-steel jaws having co-acting thin edges in operative alignment with each other so that they abut each other when the jaws are in their fully closed positions, an integral flat handle formed in continuation of each of said jaws and extending in a direction transversely of the jaw, a pair of spaced apart pivot-receiving portions formed integrally with each jaw and handle, said two pairs of pivot-receiving portions having aligned pivot holes therethrough, a pivot extending through said pivot holes and permanently securing said jaws and their respective handles in pivotal relation to each other, a spring resiliently urging said jaws toward their closed positions and said handles into their spread-apart positions, the co-acting thin edges of said jaws having intermeshing matrix gripping teeth along juxtaposed portions thereof near the pivoted ends thereof and along juxtaposed portions thereof near the ends thereof farthest from the pivot and having relieved non-abutting portions between the serrated portions thereof.

4. A dental matrix clamp for holding in place in a taut condition a flexible dental matrix strip around a tooth whose cavity is to be filled with a dental filling-material, including a pair of jaws formed of a corrosion resistant metal and having thin co-acting edges in operative alignment with each other so that they abut each other when the jaws are in their fully closed positions, an integrally flat handle formed in continuation of each of said jaws and extending in a direction transversely of the jaw, a pivot-receiving portion formed integrally with each jaw and handle, said two pivot-receiving portions having aligned pivot holes therethrough, a pivot extending through said pivot holes and permanently securing said jaws and their respective handles in pivotal relation to each other, a spring resiliently urging said jaws toward their closed positions and said handles into their spread-apart positions, the thin co-acting edges of said jaws having intermeshing matrix-gripping teeth along juxtaposed portions thereof near the pivoted ends thereof and along juxtaposed portions thereof near the ends thereof farthest from the pivot and having relieved non-abutting portions between the serrated portions thereof.

5. A dental matrix clamp for holding in place in a taut condition a flexible dental matrix strip around a tooth whose cavity is to be filled with a dental filling-material including a pair of jaws formed of a corrosion-resistant metal and having thin co-acting edges in operative alignment with each other so that they abut each other when the jaws are in their fully closed positions, an integral handle formed in continuation of each of said jaws and extending in a direction transversely of the jaw and generally at a right angle to the below-mentioned pivot, a pivot-receiving portion formed integrally with each jaw and handle, said two pivot-receiving portions having aligned pivot holes therethrough, a pivot extending through said pivot holes and permanently securing said jaws and their respective handles in pivotal relation to each other, the angle between each handle and its respective jaw being such that the average of said two angles is approximately 90° to the median meeting-line of the jaws in their fully closed position when said handles are in their correspondingly spread-apart positions, a spring resiliently urging said jaws toward their closed positions and said handles into their spread-apart positions, and the thin co-acting edges of said jaws having intermeshing dam-gripping teeth along juxtaposed portions thereof near the pivoted ends thereof and along juxtaposed portions thereof near the ends thereof farthest from the pivot and having relieved non-abutting portions between the serrated portions thereof.

6. A dental matrix clamp for holding in place in a taut condition a flexible dental matrix strip around a tooth whose cavity is to be filled with a dental filling-material, including a pair of thin and generally co-planar sheet-metal jaws, an integral bracing flange extending laterally from the outer edge of each jaw, each of said flanges being tapered and being wider at the pivoted end of the jaw and being reduced in width as it approaches the free end of the jaw, an integral flat handle formed in continuation of each of said bracing flanges and at an angle thereto, a pair of spaced-apart pivot-receiving portions formed integrally with each jaw and its flange and handle, said two pairs of pivot-receiving portions having aligned pivot holes therethrough whose common axis is generally at a right angle to the plane of said jaws and generally parallel with the planes of said flanges and handles, a pivot extending through said pivot holes and permanently securing said jaws and their respective flanges and handles in pivotal relation to each other, a spring resiliently urging said jaws toward their closed positions and said handles into their spread-apart positions, the angle between each handle and its respective jaw being such that the average of said two angles is approximately 90° to the median meeting-line of the jaws in their fully closed position when said handles are in their correspondingly spread-apart positions, the co-acting edges of said jaws having intermeshing tooth-like serrations along juxtaposed portions thereof near the pivoted ends thereof and along juxtaposed portions thereof near the ends thereof farthest from the pivot and having relieved portions intermediate said pairs of serrated portions.

7. A dental matrix clamp for holding in place in a taut condition a flexible dental matrix strip around a tooth whose cavity is to be filled with a dental filling-material, including a pair of thin and generally co-planar sheet-metal jaws, an integral bracing flange extending laterally from the outer edge of each jaw and generally at a right angle to the plane of the jaw, each of said flanges being tapered and being wider at the pivoted end of the jaw and being reduced in width as it approaches the free end of the jaw, an integral flat handle formed in continuation of each of said bracing flanges and at an angle thereto and extending in a direction generally parallel with the plane of the jaw, a pair of spaced-apart pivot-receiving portions formed integrally with each jaw and its flange and handle, said two pairs of pivot-receiving portions having aligned pivot holes therethrough whose common axis is generally at a right angle to the plane of said jaws and generally parallel with the planes of said flanges and handles, a pivot extending through said pivot holes and permanently securing said jaws and their respective flanges and handles in pivotal relation to each other, a spring resiliently urging said jaws toward their closed positions and said handles into their spread-apart positions, the angle between each of said handles and its respective jaw being such that the average of said two angles is approximately 90° to the median meeting-line of the jaws in their fully closed position when said handles are in their correspondingly spread-apart positions, the co-acting edges of said jaws having intermeshing tooth-like serrations along juxtaposed portions thereof near the pivoted ends thereof and along juxtaposed portions thereof near the ends thereof farthest from the pivot and having relieved portions intermediate said pairs of serrated portions.

References Cited by the Examiner
UNITED STATES PATENTS

| 2,519,246 | 8/50 | Haas | 32—63 |
| 2,618,065 | 11/52 | McAfee | 32—63 |
| 2,645,013 | 7/53 | Mathison | 32—63 |
| 2,698,483 | 1/55 | Berkowitz | 32—63 |
| 2,790,238 | 4/57 | Trangmar | 32—63 |

FOREIGN PATENTS 208,848  2/40  Switzerland.

RICHARD A. GAUDET, *Primary Examiner.*